United States Patent

[11] 3,554,343

| [72] | Inventors | William L. Calvert<br>Westfield;<br>James H. Bowen, Somerville, N.J. |
|---|---|---|
| [21] | Appl. No. | 802,446 |
| [22] | Filed | Feb. 26, 1969 |
| [45] | Patented | Jan. 12, 1971 |
| [73] | Assignee | Union Carbide Corporation<br>New York, N.Y.<br>a corporation of New York<br>Continuation-in-part of application Ser. No.<br>664,102, Aug. 29, 1967, now abandoned. |

[54] MOTION DETECTING METHOD AND APPARATUS
12 Claims, 3 Drawing Figs.

[52] U.S. Cl.................................................. 192/127,
192/142; 200/61.17, 200/80; 226/11; 317/148.5;
340/259
[51] Int. Cl...................................................... F16d 71/00
[50] Field of Search........................................... 317/148.5;
323/22; 200/61; 192/127; 226/11(Consulted);
340/259, 260; 192/125A

[56]  References Cited
UNITED STATES PATENTS

| 2,775,753 | 12/1956 | Kennedy ...................... | 340/259 |
| 2,932,382 | 4/1960 | James........................... | 192/125A |
| 2,994,074 | 7/1961 | Durand et al................. | 340/259 |
| 3,130,394 | 4/1964 | Hinz et al...................... | 340/259 |

*Primary Examiner*—Benjamin W. Wyche
*Attorneys*—Paul A. Rose, Gerald R. O'Brien, Jr. and Aldo John Cozzi ABSTRACT: Motion detecting sensor is provided which stops a machine when a malfunction occurs such as a supply roll which fails to feed.

PATENTED JAN 12 1971
3,554,343
SHEET 1 OF 2
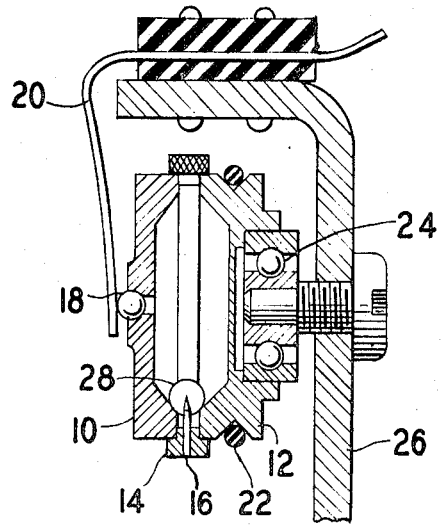
FIG. I.
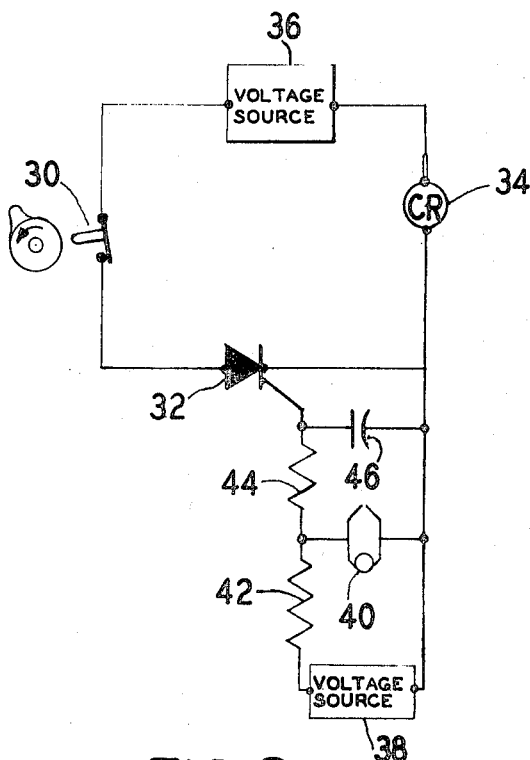
FIG. 2.
INVENTORS
WILLIAM L. CALVERT
JAMES H. BOWEN
BY
ATTORNEY

MOTION DETECTING METHOD AND APPARATUS

This application is a continuation-in-part of application Ser. No. 664,102, filed Aug. 29, 1967 and now abandoned.

FIELD OF THE INVENTION

This invention relates to detecting machine malfunctions particularly motion stoppage of machine parts.

THE PRIOR ART

Implicit in automated machinery, for example, a fully automatic bag making and bundling machine, is the need for systems which will automatically detect machine malfunctions or the exhaustion of input materials and take appropriate action to prevent fouling of the machine or generation of an unsatisfactory product, e.g. production and bundling of an imperfect bag. A particular bag making process of current interest requires the insertion of a short length of film from each of two supply rolls at one time during each machine cycle. It is, of course, a routine occurrence for each of the supply rolls to become exhausted and it is not uncommon for the film to fail to feed into the machine. The desired response to either of these situations is for the machine to stop in the proper position for installation of a new roll of film or clearing of the malfunction. Desirably "absence of film" and "failure to feed," for example, should be detected by a single sensing system which would determine that the film had or had not moved once each machine cycle.

Commonly used types of switches for detecting motion include "plugging switches" and centrifugal switches, both of which however, are not always practical due to large size, complexity, and actuation force requirements. Photoelectric, magnetic, or capacitive sensors are unsuitable where film or other material is unprinted and devoid of identifiable markings. A small wheel or shaft turned by the moving material could, by a projection or indentation on its periphery, actuate a miniature microswitch. Arrangements of this type appear however to be unsatisfactory on two counts: first, the inherently random stopping position of a machine part upon malfunction indicates that the switch would occasionally be hung up in its actuated position, thus frustrating the subsequent action of the cycle reference switch; and second, commercially available miniature switches, in general, offer a life expectancy of far fewer cycles than are desirable for the efficient operation of a machine. A dependable and economical motion detecting sensor for machinery, including automatic machinery, has heretofore not been developed.

Accordingly, there has now been discovered method and apparatus for detecting motion or lack thereof of objects including machinery parts or material, that is simple, reliable and highly durable.

SUMMARY

Broadly the invention provides process and apparatus for detecting motion or lack thereof of an object which detecting causes a signal to be sent in an electric circuit to achieve a desired result.

More particularly this invention provides a process for detecting when a machine has malfunctioned or when an object associated with a machine has ceased moving so that the machine can automatically stop comprising:

a. energizing a relay circuit to enable said machine to proceed past a cycle-stop position;
b. deenergizing said circuit after said machine has proceeded past said cycle-stop position;
c. sensing whether said object is moving and upon sensing the movement of said object; and
d. reenergizing said relay circuit before said machine reaches the next cycle-stop position so that said relay circuit is alternately deenergized and reset as long as said object continues to move.

The system consists generally, of a relay circuit which is alternately deenergized and reset by the sequential actions of a cycle reference switch and a motion sensing switch. Failure of the motor sensing switch to reset the circuit causes the machine to stop at the next cycle-stop position.

By cycle-stop position is meant a convenient stopping point for a machine when a malfunction occurs. For example, a bag producing machine can be adapted to stop in a position where the bag material supply rolls are most accessible.

The invention will become more apparent from the following detailed specification and drawings in which:

FIG. 1 is a partial sectional elevation of a motion sensing switch embodying the invention;

FIG. 2 is a schematic representation of an electrical circuit in combination with a motion sensing switch embodying the invention.

DESCRIPTION

Figure 3:
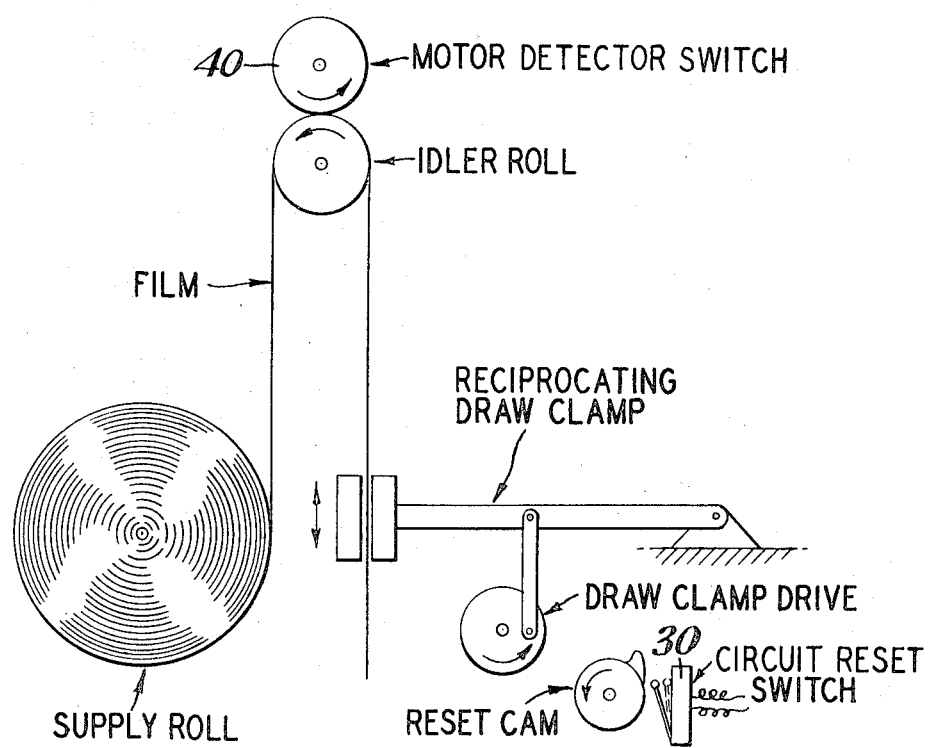
FIG. 3 is a more complete schematic representation of the motion sensing switch in combination with the supply roll of the processing line.

Referring now to the drawings, two discs 10 and 12, made of gold plated brass, are electrically separated by the insulator ring 14 as shown in FIG. 1. A small needle 16 is mounted in the insulator ring 14 and projects radially inward into the cavity between the two discs. A metallic ball 18 is pressed into the outer disc 10 to provide a low friction electrical contact between the disc and the terminal strip 20. The other disc 12, which carries a rubber tire 22, is mounted on a ball bearing 24 which, in turn, is mounted on the supporting bracket 26. Contained within the cavity between discs is a gold-plated steel ball 28. A completed electrical circuit comprises a path from the terminal strip 20 through the outer disc 10, the ball 28, the other disc 12 and the ball bearing 24 to the support bracket 26 which is electrically grounded. (It may be noted that gold plating is used on surfaces where formation of an oxide film might create an undesirably high contact resistance).

A cycle reference switch 30, a silicon controlled rectifier 32, and a relay coil 34 are arranged in series in a relay circuit across a voltage source 36 as shown in FIG. 2. The characteristics of the silicon controlled rectifier are such that a voltage pulse applied at a point will cause it to become conductive and remain conductive until the series circuit is interrupted by the opening of the cycle reference switch 30. The source of the above voltage pulse, a trigger pulse circuit, comprises a voltage source 38 the motion sensing switch 40 described above, and resistors 42 and 44 and capacitor 46 by which the sensitivity and response time of the circuit are controlled. The relay coil 34, when energized, closes a contact (not shown) which prevents the machine from stopping at its cycle-stop position. In normal operation, then, the normal sequence of events would be as follows: with the cycle reference switch closed, the silicon controlled rectifier is not conducting and the relay coil 34 is deenergized; the trigger circuit, which is normally shorted out by the motion sensing switch 40, supplies a pulse to the silicon controlled rectifier 32 when, for example, film from a supply roll moves to a bag machine and causes the motion sensing switch to break its circuit momentarily; this causes the relay to become energized so that the machine will continue to run past its cycle-stop position; the relay coil remains energized until the machine reaches the point in its cycle where the cycle reference switch 30 opens momentarily to again deenergize the relay coil circuit. Should the film fail to move at the proper time, a trigger pulse will not occur, and the relay coil will remain deenergized, thus assuring that the machine will stop when the cycle-stop position is reached.

In a preferred form, this invention provides a switch in the form of a small wheel which rides in contact with a moving part, including a shaft or roller turned by packaging material such as film. The circumference of the wheel is sized to assure at least one revolution for each movement for example, of film from a supply roll. Therefore, the switch will interrupt the electrical circuit at least once during each film motion. At rest, the switch will always be in a closed contact position, regardless of the position of stopping. The wheel is free-turning and the switch mechanism contains no snap-action springs to impose either a limitation on its life expectancy or torsional resistance to the turning of the wheel. The design of the switch is simple, lends itself to miniaturization and economical manufacture, and, with proper materials of construction and associated circuitry, should provide many millions of cycles of reliable operation.

As indicated above the motion sensing switch preferably comprises a hollow wheel, comprising two concave discs with an electrical insulator therebetween, containing an electrically conductive ball. The wheel is mounted on an axis positioned at an angle with the vertical, preferably horizontal, so that the ball will normally lie at the bottom of the cavity making electrical contact with the rims of the two discs which constitute the wheel. Dimensions of the cavity are such that the ball can make simultaneous contact with both discs only at the periphery. The periphery of the cavity is of a conical or otherwise tapered shape, so that the ball at rest will always lie in contact with both discs. A small projection extends radially inward from one point on the periphery of the cavity, so that, as the wheel turns, the ball must be dislodged from its position against the periphery and fall, by gravity, to the bottom of the cavity. During this brief period of fall, electrical continuity between the two discs is broken. The shape of the projection, being needlelike, reduces to a minimum the possibility of the ball balancing on its point and, thereby, causing the circuit to remain interrupted when the wheel comes to rest.

The sensing switch of the present invention can be employed in various circuits, wherever a circuit interrupting device has application. It can be rotated by the moving surface being monitored directly or indirectly or turned by an independent means so that a circuit is interrupted in a predetermined sequence.

In addition to sensing the motion of rolls associated with machines as discussed above, the sensing switch and associated circuit are also suited to detecting motion or the cessation thereof, of various moving elements, such as material including sheet or film being processed by a machine, various machine parts including rotating parts, or other moving parts including oscillating parts.

In sum the motion sensing switch may be used in a variety of circuits other than that described above, and the entire system may be used for a variety of applications other than the bag machine application referred to above. The switch can be used in combination with various electrical circuits to produce any appropriate result in addition to stopping of a machine such as sounding an alarm, reloading of input material and the like. Conversely, a variety of motion sensing switches can be employed with the particular circuitry described above.

The wheel can be of various annular shapes preferably circular and the ball can have a shape varying from angular to rounded although it is desirably spherical.

The discs and ball can be made of virtually any conductive, durable materials preferably metals such as steel, brass, copper and the like and alloys thereof. These metal components can be coated with, for example, the nobel metals including gold and silver.

The insulating material which unites the disc components of the wheel can be disposed around the periphery thereof, and contact with the rims of the discs or it can unite the discs at other locations e.g. at the center thereof with the disc rims separated by narrow air space.

The insulating material can be various nonconducting, durable materials, rubber, plastic and the like or a laminate thereof, e.g. a concentric laminate of phenolic and rubber layers, the latter layer being in form of a rubber tire, for traction.

The composite wheel which can come in various sizes, including miniature, can have one or more projections e.g. needles therein which are mounted on a disc rim or on the insulating material. Providing a wheel with a plurality of projections permits motions corresponding to a fraction of a turn of the wheel to be reliably detected.

Preferably the trigger pulse circuit of the invention contains an RC damping filter, such as resistor 44 and capacitor 46, shown in FIG. 2, which prevents vibrations of the ball when in a closed-circuit position in the motion sensing switch from prematurely triggering the relay circuit. The RC value is such as to require circuit interruption of a duration sufficient to permit the ball to fall from the upper to the lower portion of the switch wheel before a trigger pulse is sent to the silicon controlled rectifier activating the relay circuit. The RC value can be adjusted in accordance with prevailing conditions such as the wheel size and ball size and weight.

The cycle reference switch is suitably operated by a cam or other suitable extension of a machine part such as the driving mechanism thereof. Thus the switch can be momentarily opened, for example, at the end of each machine cycle after the machine has proceeded past the cycle-stop position referred to above. Alternatively, the cycle reference switch can be periodically opened by a timing device independent of the machine being monitored. Preferably, however, the switch is activated by the machine.

As shown in FIG. 3, the sequence of operation is as follows:
1. Reciprocating draw clamp in full up position closes on film;
2. Reciprocating draw clamp drive advances film down;
3. As film moves down, motion detector switch 40, rotated by film, momentarily opens, driving SCR 32;
4. At the end of the downward stroke, the clamps open and the SCR circuit condition is checked (the check is made by whether relay CR 34 is energized or not);
5. As the draw clamps raise, the cam switch actuates limit switch 30, resetting the circuit for the next cycle.

We claim:
1. A motion detecting apparatus for sensing when an object has ceased moving so that an associated machine will automatically stop comprising:
   a. a relay circuit which permits said machine to proceed past a cycle-stop position as long as said relay circuit is energized;
   b. means for deenergizing said circuit after said machine has proceeded past said cycle-stop position; and
   c. trigger circuit connected to said object and activated by the movement of said object for reenergizing said relay circuit before said machine again reaches said cycle-stop position, so that said relay circuit is alternately deenergized and reset by the sequential actions of said deenergizing means and said trigger circuit means as long as said object continues to move.
2. The apparatus of claim 1 wherein said object is a supply roll having rotational movement.
3. The apparatus of claim 1 wherein said object is sheet material being processed by said machine.
4. The apparatus of claim 3 wherein said relay circuit is energized at least once for each incremental movement of said sheet material.
5. A motion detecting apparatus for sensing when sheet material has ceased being fed to a machine so that said machine will automatically stop comprising:
   a. a relay circuit having in series:
      1. a relay which permits said machine to proceed past a cycle-stop position as long as said relay circuit is energized;
      2. a silicon controlled rectifier which can be made conductive by a voltage pulse applied thereto and which becomes nonconductive when said relay circuit becomes deenergized;
      3. an electric power source for energizing said relay circuit when said rectifier is made conductive;
      4. a cycle reference switch for deenergizing said relay circuit after said machine has proceeded past said cycle-stop position; and
   b. a trigger pulse circuit for reenergizing said relay circuit before said machine reaches the next cycle-stop position, said circuit having in parallel:

1. a motion sensing switch rotatably connected to said material which at rest short circuits said trigger circuit but which becomes briefly nonconductive when rotated by the motion of said material; and
2. a second electric power source for sending a pulse of voltage to said silicon controlled rectifier when said motion sensing switch becomes nonconductive so that said relay circuit is alternately deenergized and energized in sequence as long as said material continues to feed to said machine.

6. The apparatus of claim 5 wherein said relay circuit is energized at least once by a trigger pulse for each incremental motion of said sheet material.

7. The motion detecting apparatus of claim 4 wherein said motion sensing switch comprises a pair of spaced concave metallic discs and a metallic ball which simultaneously makes physical and electrical contact with both discs only at the rims thereof, said ball falling out of and into contact with said discs as said switch is rotated so as to periodically interrupt electrical continuity between said discs.

8. A method for sensing when an object has ceased moving so that an associated machine will automatically stop comprising:
   a. energizing a relay circuit to enable said machine to proceed past a cycle-stop position;
   b. deenergizing said circuit after said machine has proceeded past said cycle-stop position;
   c. sensing whether said object is moving and upon sensing movement of said object; and
   d. reenergizing said relay circuit before said machine reaches the next cycle-stop position so that said relay circuit is alternately deenergized and reenergized as long as said part continues to move.

9. The method of claim 8 wherein said object is a roll which normally turns.

10. The method of claim 8 wherein said relay circuit is energized by sending a trigger pulse of voltage thereto.

11. The method of claim 8 wherein said relay circuit is energized at least once for each rotation of said roll.

12. The method of claim 8 wherein said object is a sheet of material communicating with said machine.